United States Patent [19]

Vinson et al.

[11] Patent Number: 4,854,127
[45] Date of Patent: Aug. 8, 1989

[54] BIMODAL SWIRLER INJECTOR FOR A GAS TURBINE COMBUSTOR

[75] Inventors: John W. Vinson, Cincinnati, Ohio; Stephen J. Howell, Georgetown; Elias H. Lampes, Lynn, both of Mass.

[73] Assignee: General Electric Company, Lynn, Mass.

[21] Appl. No.: 143,792

[22] Filed: Jan. 14, 1988

[51] Int. Cl.[4] .............................................. F23R 3/00
[52] U.S. Cl. ........................................ 60/742; 60/743; 60/748; 239/424.5
[58] Field of Search ................ 60/748, 742, 737, 740, 60/739, 743; 239/424.5, 472

[56] References Cited

U.S. PATENT DOCUMENTS

| | | | |
|---|---|---|---|
| 3,013,731 | 12/1961 | Carlisle | 239/472 |
| 3,630,024 | 12/1971 | Hopkins | 60/742 |
| 3,643,430 | 2/1972 | Emory, Jr. et al. | |
| 3,768,250 | 10/1973 | Kawaguchi | 239/424.5 |
| 3,777,983 | 12/1973 | Hibbins | 60/748 |
| 3,788,067 | 1/1974 | Carlisle et al. | 60/742 |
| 3,912,164 | 10/1975 | Lefebvre et al. | 60/748 |
| 3,937,011 | 2/1976 | Caruel et al. | 60/737 |
| 4,425,755 | 1/1984 | Hughes | 60/742 |
| 4,584,834 | 4/1986 | Koshoffer et al. | 60/737 |
| 4,726,192 | 2/1988 | Willis et al. | 60/737 |

Primary Examiner—Louis J. Casaregola
Assistant Examiner—Timothy S. Thorpe
Attorney, Agent, or Firm—Francis L. Conte; Derek P. Lawrence

[57] ABSTRACT

An improved air swirler and fuel injector for a gas turbine combustor system employs primary fuel injection into a primary recirculation combustion zone supplied by an inner annulus of swirling air at high fuel-air ratio under low power conditions. A selectively staged secondary fuel flow is supplied into an outer annulus downstream of secondary air swirlers supplying a secondary recirculation zone for combustion at higher fuel flows but lower fuel-air ratios under high power conditions. The secondary fuel flow may be separately injected into the outer annulus through conduit means extending through the primary air swirler vanes. Alternatively, the secondary fuel flow may be combined with the primary fuel in the fuel injector body and the momentum due to mass flow used to inject the fuel into the outer annulus.

17 Claims, 8 Drawing Sheets

BIMODAL SWIRLER INJECTOR FOR A GAS TURBINE COMBUSTOR

The U.S. Government has rights in this invention pursuant to Contract No. N00140-81-C-9817 awarded by the Department of the Navy.

BACKGROUND OF THE INVENTION

The present invention relates generally to an improved swirler and fuel injector for a gas turbine engine combustor, and, more specifically, to an improved swirler and fuel injector for independently supporting primary and secondary recirculation zones within the combuster to extend operating range.

Systems for mixing air and fuel so as to establish stable recirculation zones where combustion can occur in a gas turbine are well-known in the art and take various forms. Gas turbine combustors used in aircraft engines also need to operate over a range of fuel-to-air ratios, as the total flow of fuel is varied to adjust the power output of the engine. A rich fuel-air ratio is desired at low fuel flow for stable combustion while a lean fuel-air ratio is desired at high fuel flow to reduce smoke. A typical swirler-fuel inejctor assembly employs a central fuel injector disposed within an assembly of air swirlers receiving pressurized air from the gas turbine compressor at the inlet end of a gas turbine combustor. Atomized fuel is sprayed into the air flow from a pressure atomizing spray nozzle or fed in from an airblast atomizer, so that atomization of the fuel will be largely accomplished by high velocity air flow.

In modern high temperature gas turbine combustors, especially those utilized in aircraft engines, the maximum possible fuel-air ratio operating range is desired between flame blowouts, i.e. extinguishing of flame, on engine deceleration transients, and the high power limit, imposed by visible smoke production. Techniques previously used to extend the operating range include variable geometry combustors, double annular combustors, and selective fueling, i.e., supply of fuel only to selected fuel nozzles at low power.

Variable geometry combustors have the disadvantage of added cost, weight and decreased reliability of the complex mechanical arrangement required to vary the combustor geometry.

Double annular combustors employ two coannular rows of swirlers with independently varied fuel flow from injector nozzles in the inner and outer rows. This arrangement also has disadvantages due to the relative complexity thereof.

In selective fueling, the swirlers are arranged in a single row, whereby fueled, and selectively fueled-unfueled nozzles alternate. Such designs frequently encounter undesirable carbon accumulation in the nozzles which are shut off during portions of the engine's operating time when burning liquid hydrocarbon fuels.

Accordingly, it is an object of the present invention to provide a new and improved swirler fuel injector for a gas turbine engine combustor which will extend the operating range of a gas turbine at varying fuel-air ratios.

Another object of the invention is to provide an improved swirler and fuel injector for separately fueling primary and secondary recirculation zones in a gas turbine combustor from a central fuel injector.

Another object of the invention is to provide an improved swirler and fuel injector with a geometry which will extend the operating range and is adaptable to the existing geometry of an aircraft gas turbine engine.

Another object of the present invention is to provide an improved co-annular swirler and fuel injector suitable for bimodal fuel injection in a gas turbine combustor.

SUMMARY OF THE INVENTION

Briefly stated, the invention comprises an improved swirler and fuel injector for a gas turbine combustor of the type supplied with compressed air at its inlet end, and a source of fuel with fuel flow control means supplying a primary flow at low gas turbine power and both primary and secondary flow at high gas turbine power. An annular flow directing means guiding air into the combustion liner inlet has a centrally disposed fuel injector body with one or more fuel manifolds. A fuel atomizing nozzle on the downstream end of the fuel injector body is connected to a fuel manifold. A tubular member between the fuel injector body and the annular flow directing means divides the air flow into an inner and outer annulus. Primary air swirler means and secondary air swirler means are disposed at the inlets to the respective inner and outer annuli and supply segregated air flow to a primary recirculation zone and a secondary recirculation zone, respectively.

In one embodiment, a plurality of conduit means connected to a second fuel manifold extend outward through the primary air swirler and conduct a secondary fuel flow into the second annulus downstream of the secondary air swirler means.

In another embodiment, the primary and secondary flows are combined in a fuel manifold, and their momentum used to traverse the inner annulus without substantial droplet dispersal into the outer annulus.

BRIEF DESCRIPTION OF THE DRAWINGS

The novel features believed characteristic of the invention are set forth in the appended claims. The invention, in accordance with a preferred embodiment, together with further objects and advantages thereof, is more particularly described in the following detailed description taken in conjunction with the accompanying drawings, in which:

DETAILED DESCRIPTION

Figure 1:
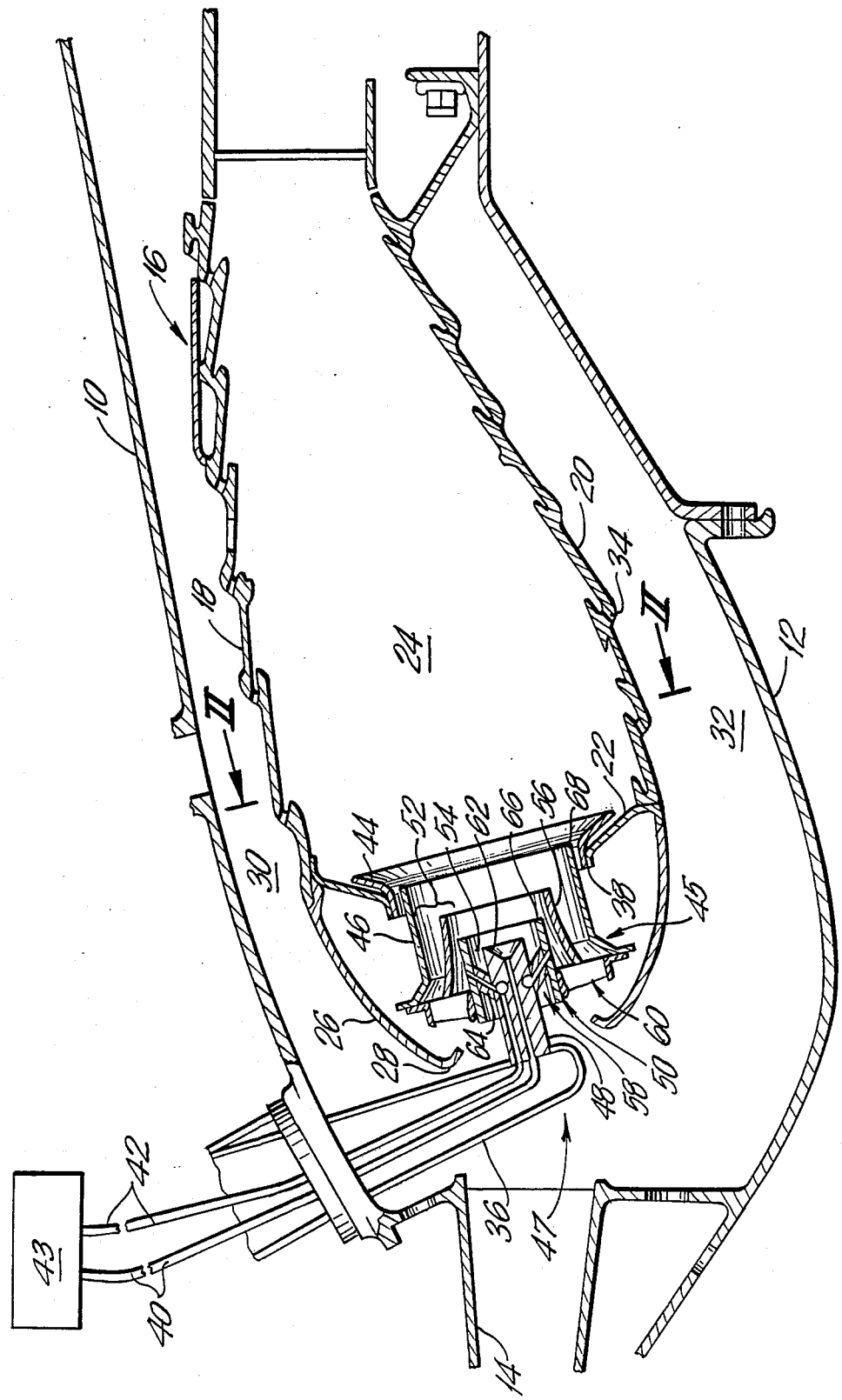
FIG. 1 is a sectional view of an exemplary combustor of a gas turbine engine including a swirler and fuel injector in simplified or diagrammatic form.
Figure 2:
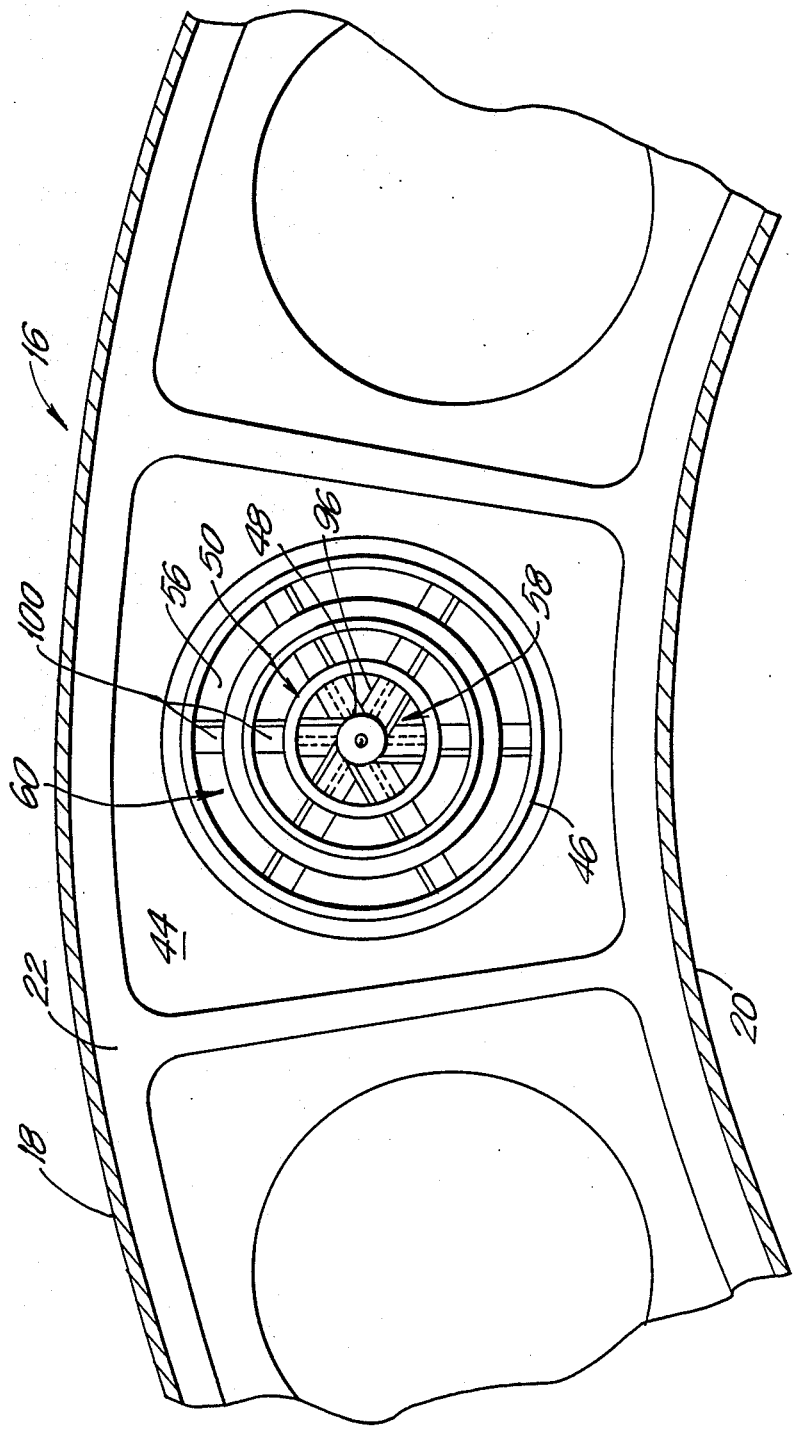
FIG. 2 is a end view of a portion of the gas turbine combustor taken along lines II—II of FIG. 1.

Referring now to FIGS. 1 and 2 of the drawing, an exemplary gas turbine combustor is illustrated within the operating environment of a gas turbine aircraft engine, the other parts of which are conventional and are not illustrated. The illustrated part of the gas turbine includes an outer casing 10 and an inner casing 12 having an upstream inlet 14 supplying compressed air from a compressor (not shown) to sustain combustion of fuel within the gas turbine combustor shown generally at 16. As shown in FIGS. 1 and 2, the gas turbine combustor 16 is of the annular type, although it is to be understood that any type, either the annular or the can-annular configuration, may be employed with the present invention. An outer annular liner 18, an inner annular liner 20 and as annular dome 22 define together between them an annular combustion chamber 24. A flow dividing extension 26, with inlet 28 divides the airfow from passage 14 into an outer air passage 30 and inner air passage 32. Suitable apertures, such as 34, supply cooling air from passages 30, 32 to cool the liner in a manner well-known in the art. Spent combustion products are discharged from the downstream end of combustion chamber 24 to turbine blades (not shown) to turn the compressor and to create thrust.

A fuel injector, one of which is shown generally at 36, is provided at each of a number of circumferentially spaced openings 38 around the dome 22. Each such injector 36 is brought in through a flanged fitting on the outer casing 10. Each injector 36 is supplied by a primary fuel pipe 40 and a secondary fuel pipe 42 connected to a conventional fuel source and control system 43. The control system 43 is effective for regulating total fuel flow and for regulating the division of fuel between primary and secondary fuel pipes 40, 42. Total fuel flow is controlled in accordance with a desired power output between selected maximum and minimum limits, whereas flow split between primary and secondary may be controlled by either a pressure regulated valve or by a control system sensing engine flow and controlling fuel-air ratio directly. A type of control system is contemplated herein in which primary fuel flow is always present at a sufficiently high fuel-air ratio to sustain combustion and in which secondary fuel flow is "staged" or added at increased power levels at a position separate from the primary fuel flow. Staging increases to a point which, at maximum power of the gas turbine, is still below the smoke limiting fuel-air ratio. This control is defined herein as bimodal fuel control.

Disposed in each of the circumferentially spaced inlets 38 of dome 22 is a fixed substantially rectangular baffle 44, the shape of which is best seen in FIG. 2. The baffle 44 is used to protect the structural dome 22 from the combustion flame in 24.

A swirler assembly 45 is associated with each fuel injector 36 and collectively comprise a swirler and fuel injector, or simply swirler-injector 47. The swirler 45 includes a barrel 46 which is open at both ends to serve as an annular flow directing means for combustion air into combustion chamber 24 and which is disposed in a round hole in the center of each baffle 44. Disposed coaxially along the centerline axis of barrel 46 is a fuel injector body 48 of the injector 36 indicated only in simplified fashion in FIGS. 1 and 2. A tubular member 50 is coaxially disposed and spaced between the fuel injector body 48 and annular flow directing means 46 to provide an outer annulus 52 and an inner annulus 54. Outer annulus 52 is further subdivided by a venturi tube 56.

The venturi tube 56 serves several functions. It provides a flame holding surface from which the flame becomes fixed in space. In addition, because the venturi exit is the source of the recirculating airflow inside the combustor, it stops the flame from propagating upstream to the fuel injector itself. In an airblast type atomiser the venturi also provides a secondary source of fuel droplet breakdown. Conventionally, only one such surface is provided per atomiser. But in accordance with one embodiment of this invention where two distinct recirculation zones are used, an additional surface is provided. Hence both tubular member 50 and venturi tube 56 provide such surfaces.

Primary air swirler means 58 are disposed in the inner annulus 54 and secondary air swirler means 60 are disposed in the outer annulus 52. Primary fuel flow is supplied from the fuel pipe 40 through a fuel atomizing nozzle 62 and secondary fuel flow is supplied from the fuel pipe 42 through conduit means 64 extending through the primary air swirler means 58 into the outer annulus 52 downstream of the secondary air swirler means 60. Tubular member 50 has a downstream and 66, which extends donwstream beyond nozzle 62. Nozzle flow directing means 46 has a downstream end 68 which extends downstream beyond downstream end 66 of the tubular member.

Figure 3:
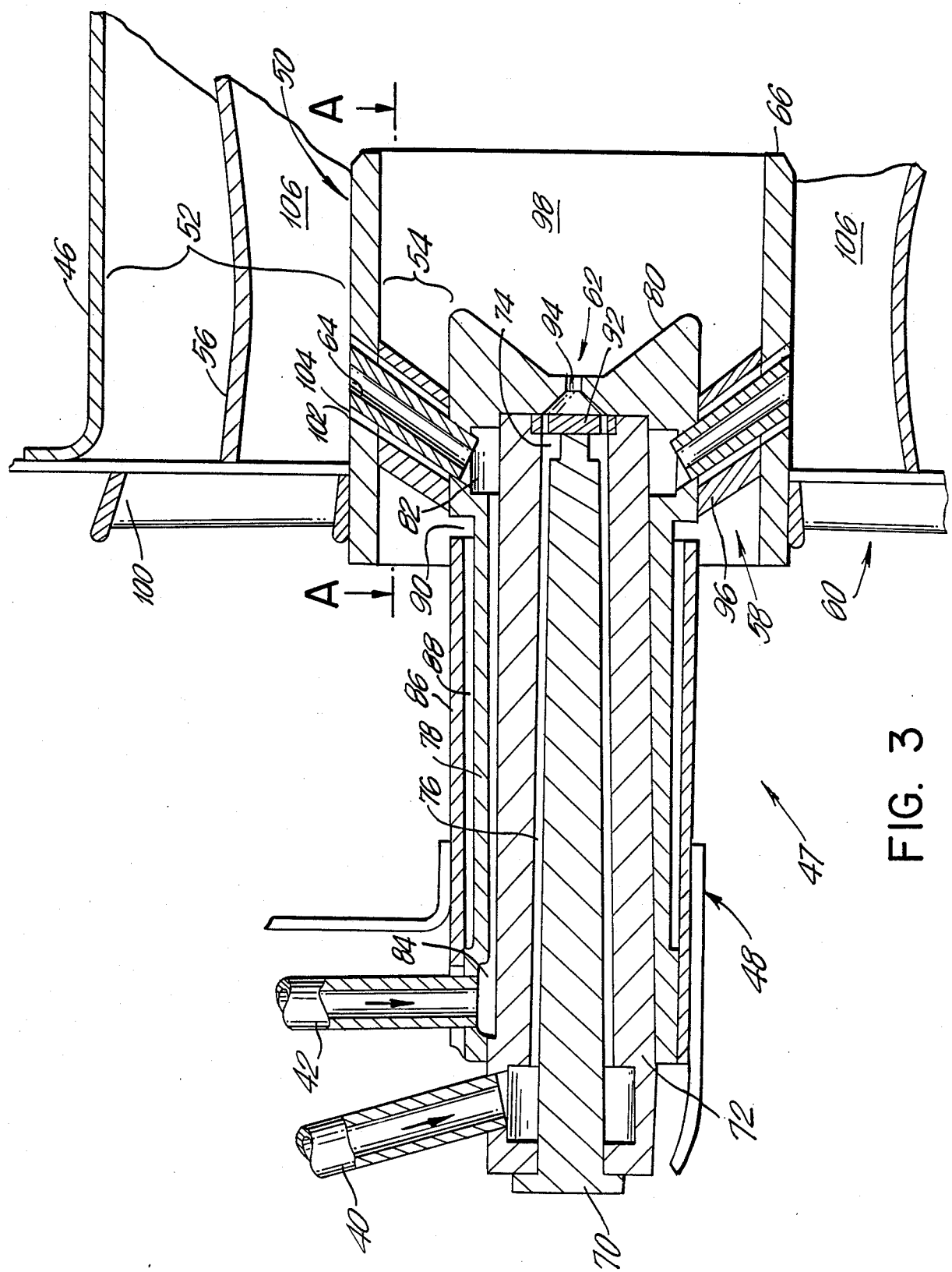
FIG. 3 is an enlarged cross sectional view of one form of the improved swirler and fuel injector of the present invention.

Referring now to the enlarged cross sectional view of FIG. 3, the details of a preferred embodiment of the improved swirler and fuel injector 47 will be discussed. Fuel injector body 48 is conveniently manufactured as four coaxial members comprising a solid core piece 70, an inner cylindrical piece 72 defining with core 70, an annular primary fuel manifold 74 connected to pipe 40 via a longitudinal annular passage 76. An intermediate cylindrical member 78 terminating in a pressure atomizing nozzle and piece 80 also defines with member 72 a secondary fuel manifold 82, connected by longitudinal passage 84 to secondary fuel pipe 42. An outer cylindrical heat shield 86 is spaced from member 78 to define an insulating dead air space 88 with an inlet 90. A fuel metering disk 92 including a plurality of fuel passages supplies primary fuel from primary manifold 74 to an outlet 94 of the end piece 80 in pressure atomizing nozzle 62.

The primary air swirler means 58 comprises a plurality of circumferentially spaced hollow stationary swirl vanes 96 connected between the outer cylinder 76 of fuel injection body 48 and tubular member 50 so as to impart swirl to air entering the inner annulus 54. Swirl vanes 96 preferably slope downstream in a radially outward direction to adapt the improved swirler and fuel injector 46 to existing gas turbine geometry. The downstream end 66 of tubular member 50 extends downstream beyond the terminating end of nozzle 62 to define a primary recirculation zone 98 which receives fuel from the primary fuel pipe 40 along with air from the primary swirler 96 in a predetermined ratio to product a locally rich flame-holding mixture in the primary recirculation zone 98. The the swirler 58 and metering disk 92 are sized such that the fuel-air ratio in primary zone 98 remains high enough to sustain stable combustion under the leanest fuel-air ratio conditions the gas turbine will encounter.

The secondary air swirler means 60 comprises a plurality of circumferentially space stationary vanes 100, which are directed to impart a swirl to air entering the outer annulus 52. Staged secondary fuel flow is supplied from manifold 82 through conduit means 64 which preferably comprise suitably heat shielded pipes which extend through the center of respective primary swirler vanes 96.

Figure 3A:
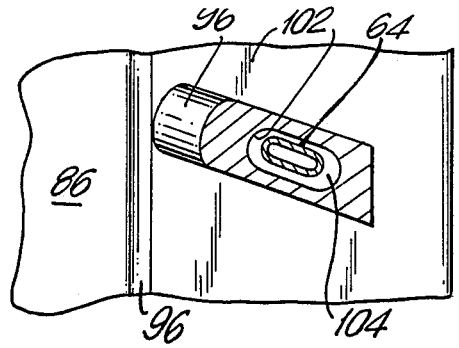
FIG. 3a is a view, taken along lines A—A of FIG. 3, through a single vane of the primary air swirler looking radially inward toward a portion of the fuel injector body.

Reference to FIG. 3a of the drawing illustrates a cross section through one such vane 96. Conduit 64 comprises a pipe spaced within a hole 102 extending longitudinally through the vane. A suitable air space 104 serves to insulate fuel conduit 64 to reduce clogging and coking due to hot temperatures. Referring back to FIG. 3 of the drawing, the downstream sloping conduits 64 place their outlets to discharge into the outer annulus 52 downstream of secondary air swirler means 60 thus providing airblast atomization of the secondary fuel. The mixture of secondary fuel and secondary air establishes a separately supplied secondary recirculation zone 106, which surrounds the primary recirculation zone 98.

Figure 4:
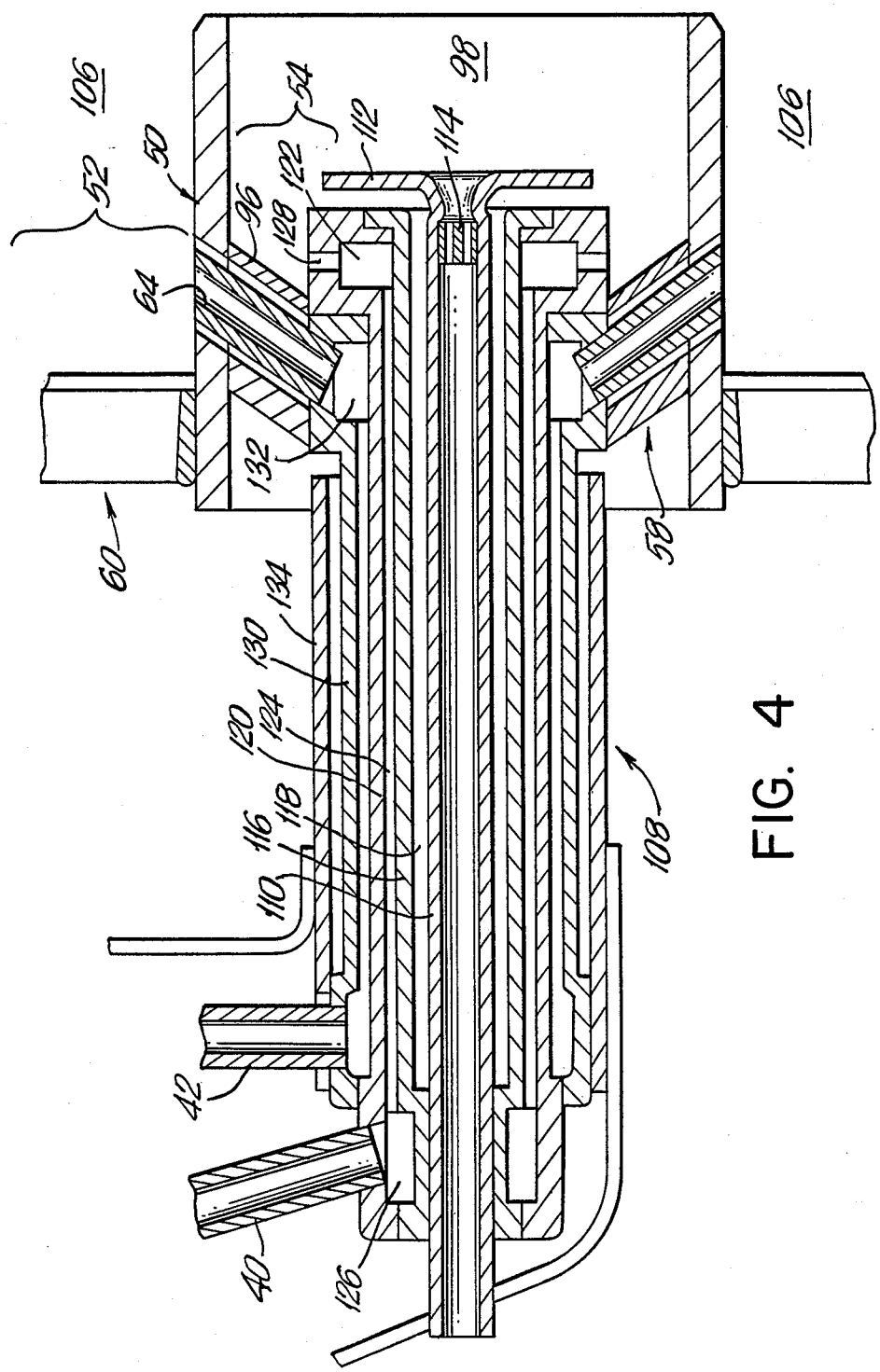
FIG. 4 is an enlarged cross sectional view of an alternate form of portions of the improved swirler and fuel injector of the present invention.

Referring now to FIG. 4 of the drawing, a modified form of the fuel injection body is shown, which employs airblast atomization of the primary fuel rather than pressure atomization. The primary and secondary fuel pipes 40, 42, tubular member 50, primary air swirler 58 with vanes 96 and primary fuel conduit means 64, as well as other swirler members and flow guiding means not shown are the same as previously described. The modified fuel injection body, indicated generally as 108, is made up of five coaxial cylindrical members. A first central tube 110 with flared face plate 112 disposed perpendicularly thereto contains a swirler insert 114. The latter is not intended to supply the primary combustion air, but imparts a sweep of cooling air channeled therein from the air inlet 14 (of FIG. 1) and over face plate 112. A second cylindrical member 116 is mounted on and spaced concentrically from tube 110 to provide a heat shielding air space 118. A third cylindrical member 120 defines with member 116 a primary fuel manifold 122 connected to pipe 40 via longitudinal passage 124 and a chamber 126. Opening from fuel manifold 122 into the inner annulus 54 are radially directed airblast atomization ports 128.

A fourth cylindrical member 130 defines with member 120 a similar secondary fuel manifold 132 supplied by secondary fuel pipe 42 and feeding secondary fuel conduit means 64 as before. Lastly, a fifth or heat shield cylinder 134 is provided in the same manner as previously described with respect to shield 86 in connection with FIG. 3.

As before, a primary recirculation zone is established within tubular member 50 as indicated at 98 and a surrounding secondary recirculation zone indicated at 106.

Figure 5:
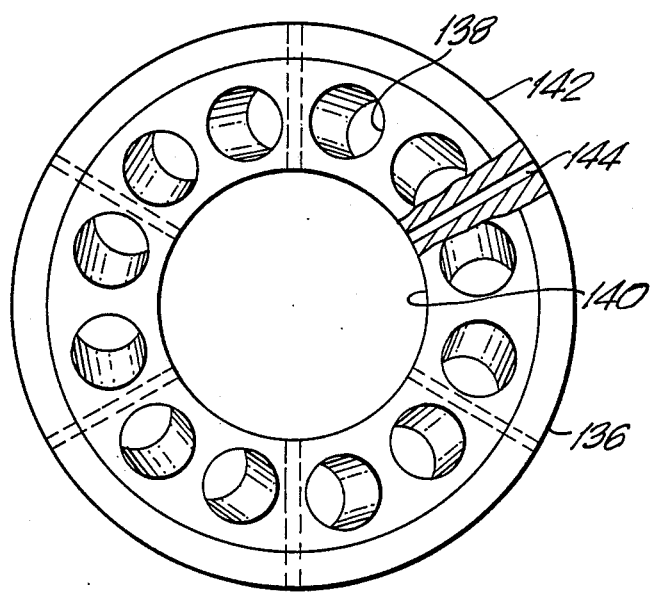
FIG. 5 is an end view of an alternate form of primary air swirler in accordance with the present invention.

An alternate form of the primary air swirling means 58 with the conduit means 64 extending through it is depicted in end view in FIG. 5. Rather than employing circumferentially spaced swirl vanes 96, FIG. 5 employs a swirl ring 136 with circumferentially spaced swirl holes 138, which are axially and tangentially directed to impart swirl to the air. Swirl ring 136 has an inner opening 140, which fits over the fuel injector body 48 (not shown) and an outer periphery 142, which fits within a tubular member such as 50 (not shown). A plurality of radially directed conduit means 144 are provided by radial passages drilled or cast into swirler ring 136. These are connected to a secondary fuel manifold in the fuel injector (like manifold 82 of FIG. 3) and open into the outer annulus 52 downstream of the secondary air swirler 60 to provide airblast atomization of the secondary fuel as before.

OPERATION

The invention provides the achievement of two stable recirculation zones which are coannular but allowing them to be reached by a central single fuel injector. The primary fuel flow in each injector is always present to cool the primary fuel nozzle 62 and prevent carbon deposition in the fuel passages, either in the pressure atomized version shown in FIG. 3 or in the airblast atomization version shown in FIG. 4. The secondary recirculation zone 106 is segregated from the primary recirculation zone 98 so that it can be independently supplied by staging secondary fuel flow through conduits (64,144) extending through the primary air swirler (58, 136) into the outer air annulus 52 downstream of the secondary air swirler 60.

EMBODIMENT USING MOMENTUM STAGING

Figure 6:
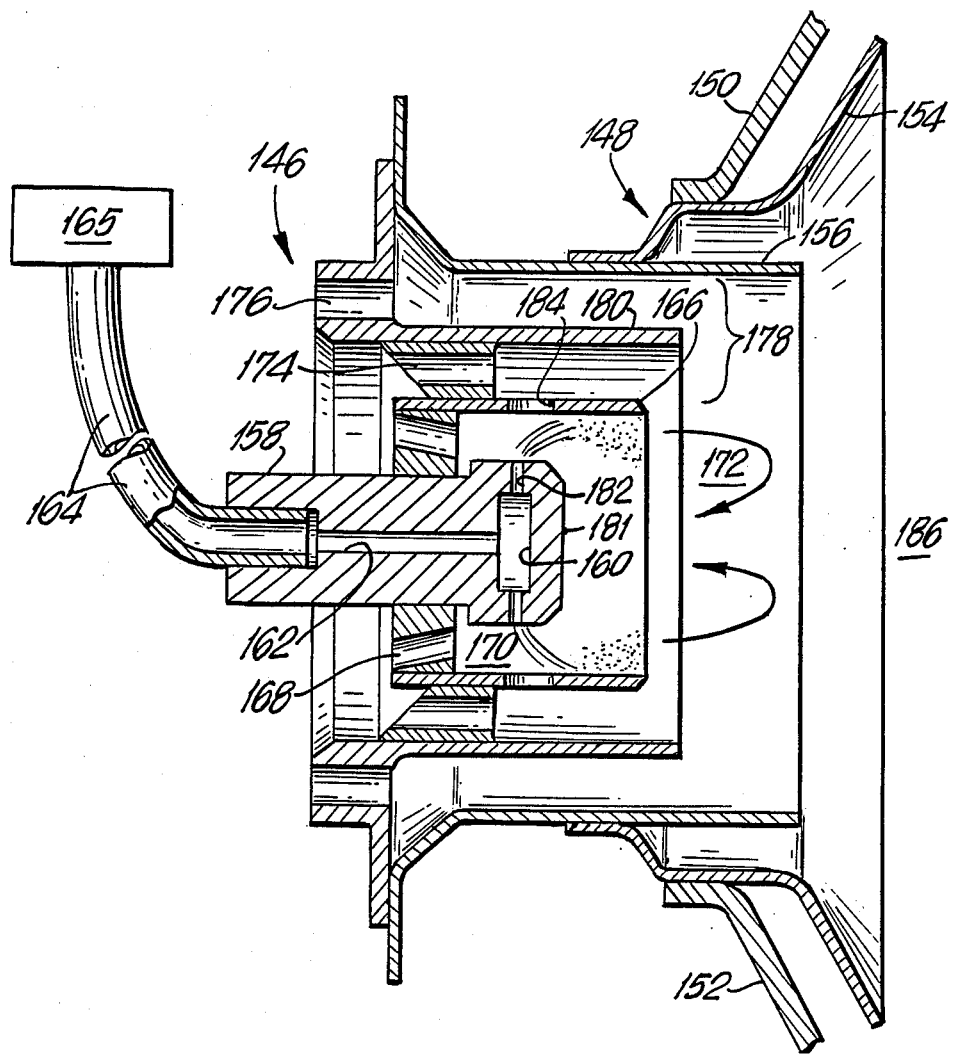
FIG. 6 is a simplified sectional view of an upstream end of an exemplary combustor of a gas turbine engine including a modified form of the swirler and fuel injector using momentum staging, shown under low gas turbine power conditions.
Figure 7:
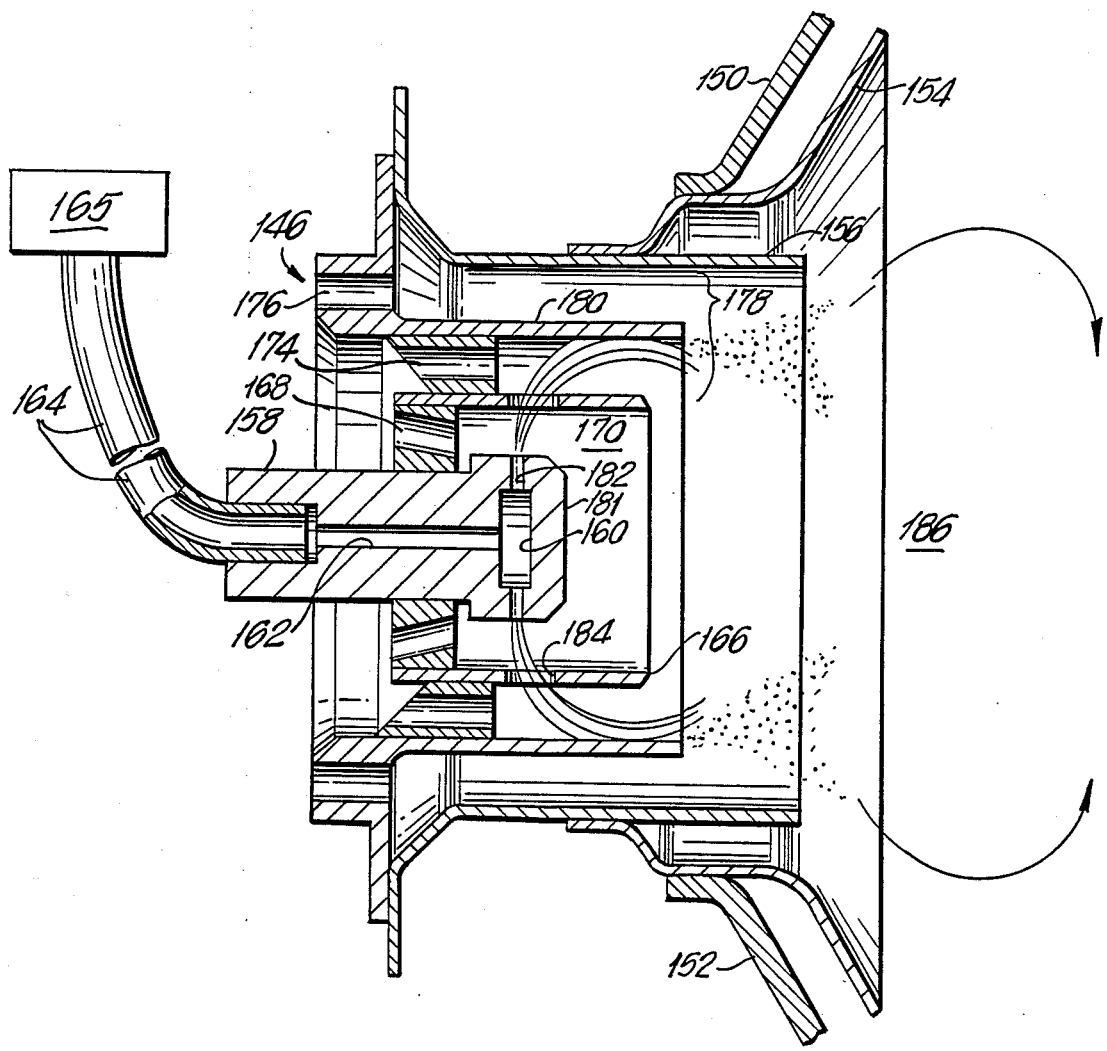
FIG. 7 is the same swirler and fuel injector as in FIG. 6, but illustrated under high gas turbine power conditions.
Figure 8:
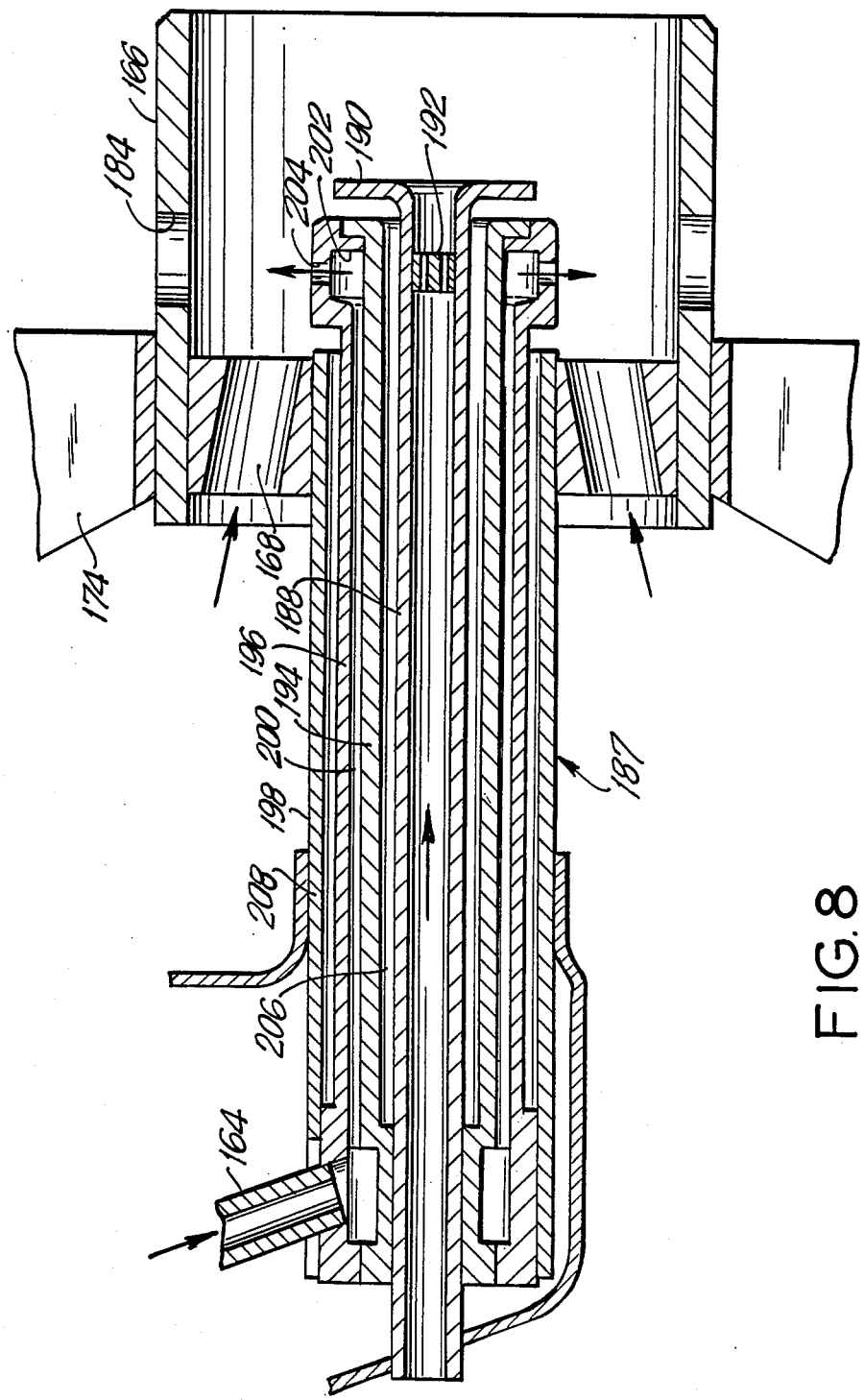
FIG. 8 is an enlarged cross-sectional elevation view of a modified form of portions of the improved swirler and fuel injector for use with the modification shown in FIGS. 6 and 7.

Referring now to FIGS. 6, 7, and 8 of the drawings, a modified embodiment of the invention is illustrated in which the primary fuel flow and the staged secondary fuel flow are combined. Instead of physically injecting the fuel from two different manifolds separately into the inner and outer swirling air annuli, the primary and second fuel flows are combined and the dynamics of fuel and air are used to control staging.

Referring now to FIG. 6 of the drawing, portions of a modified swirler and fuel injector 146 are shown mounted within an inlet 148 defined between an outer annular combustor liner 150 and an inner annular combustor liner 152. As before, a baffle 154 disposed in inlet 148 supports an annular flow directing means (or barrel) 156. Centrally disposed along the centerline axis of the flow directing means 156 is a fuel injector body 158. The fuel injector body 158 includes a radially extending central fuel manifold 160, which is connected via an internal longitudinal passageway 162 to a single fuel pipe 164. Fuel pipe 164 is connected to a suitable bimodal fuel controller 165 which may be similar to the fuel flow control means 43 previously described. However, in this case, the primary fuel flow and the secondary fuel flow are not split and separately regulated, but rather are combined and controlled in accordance with a desired power output between selected maximum and minimum limits. The flow of total fuel though the pipe 164 varies from a minimum to a maximum and is suitably controlled in accordance with the desired power output of the gas tubrine combustor. The use of the single pipe 164 offer advantages in reduced plumbing complexity and also eliminates the possibility of fuel coking in the secondary feed pipe which would be shut down at low power.

As before, a tubular member 164 is disposed mutually coaxial with and spaced between the fuel injector body 158 and the annular flow directing means 156. A primary air swirler 168 supplies air into an inner annulus 170 supplying air for combustion in a primary recirculation zone 172. A secondary air swirler 174 and an auxiliary air swirler 176 are arranged to supply swirling air into an outer annulus 178. Swirlers 174, 176 may provide air swirl either in the same direction or with contra-rotating swirls. Outer annulus 178 is subdivided by an annular flow splitter 180 which is comparable to the venturi 56 shown in FIGS. 1–3 and serves as a filming surface for an impinging jet of fuel in a manner to be described.

The central fuel injector body 158 is arranged to serve as an airblast atomization nozzle by virtue of a fuel nozzle 181 having a plurality of radially directed passages 182 communicating with fuel manifold 160. Passages 182 are circumferentially spaced around the fuel nozzle body and are radially aligned with a number of circumferentially spaced openings 184 in the tubular member 166 so that the openings 184 are disposed radially over corresponding passages 182. In addition, passages 182 are aligned with the air jets entering through swirler 168 to create an array of "plain jet" atomisers. Similarly, the openings 184 are aligned with the air jets entering through swirler 174.

When primary fuel flow is furnished under low power conditions of the gas turbine, the mass rate of fuel flow entering fuel pipe 164, manifold 160 and ejected from the airblast radially directed passages 182 is selected with respect to the air entering primary swirler 168, such that the radially outward momentum of the fuel is insufficient relative to the axial momentum of air from swirler 158 to cause it to reach the openings 184. Under these circumstances, primary fuel is atomized in the inner annulus 170 and supplies the primary recirculation zone 172 for stable combustion with a fairly rich fuel-to-air mixture. In this mode of operation, little, if any, fuel reaches past the passages 184 and into the annulus 178.

Referring now to FIG. 7 of the drawing, exactly the same structure is shown as in FIG. 6, and the same reference numerals are applied as discussed in connection with FIG. 6. In this case, however, both primary and secondary fuel flows enter the fuel injector body 158 through the single fuel pipe 164 (these being combined in one flow rather than separate flows as previously discussed in connection with FIGS. 1–5). The radial outward momentum and the mass rate of the combined fuel flow leaving the radially facing passages 182 is selected such that substantially all the fuel passes as a jet without substantial droplet dispersal across the inner annulus 170 through aligned openings 184 in the tubular member 166 and into the outer annulus 178 downstream of the secondary swirler 174. Fuel is atomized by the air stream and atomization is assisted by impingement of the jets of fuel on a filming surface, i.e. the inner surface of the flow splitter 180. The atomized fuel mixes with air from secondary swirler 174 and auxiliary swirler 176 and supplies a secondary recirculation zone, designated by reference number 186. Although substantially all of the fuel enters the outer annulus 178, a relatively small amount may impinge upon the inner surface of the tubular member 166. Under these conditions, the rate of fuel flow is selected so as to provide a fairly lean and well distributed combustion mixture in both secondary and primary recirculation zones 186 and 172 to reduce smoke under high power conditions of the gas turbine. Furthermore, the fuel flow rate may also be selected so that a predetermined portion of the fuel flows as primary fuel to the inner annulus 170 and also a complementary portion of the fuel flows as secondary fuel to the outer annulus 178.

The fuel nozzle 181, tubular member 166 (including openings 184 thereof), and primary swirler 168 are sized in a preselected manner, so that the fuel enters the inner annulus 170 or the outer annulus 178, as above desired, depending on the selected mass flow rate and momentum, of the fuel.

The swirler and fuel injector 146 illustrated in FIGS. 6 and 7 merely serves to show the operating principle in schematic form of an alternate embodiment of the invention which is termed "momentum staging" of the fuel, since the momentum of the fuel with respect to the momentum of the air entering the device serves to accomplish staging or operation of the bimodal swirler and fuel injector 146 in at least two distinct modes under high power conditions and under low power conditions.

A practical arrangement of a fuel injector body 187 for 187 accomplishing momentum staging is illustrated in the enlarged cross sectional view shown in FIG. 8. Reference numerals used which are the same as those in FIGS. 6 and 7 include the fuel pipe 164, primary swirler 168, tubular member 166 with openings 184, and secondary air swirler 174.

The details of the fuel injector body 187 show an inner heat shield tube 188, having a flared face piece 190 and a cooling air spin member 192. Successively disposed and spaced around the inner heat shield tube 188 are an inner cylindrical member 194 and outer cylindrical member 196, and an outer heat shield tube 198. Inner and outer cylindrical members 194, 196 define between them a longitudinal fuel passage 200 communicating at one end with fuel pipe 164 and at the other end with a fuel manifold 202. Fuel manifold 202 is annular and communicates with a plurality of radially directed, circumferentially spaced nozzles 204. The latter are radially aligned with and face openings 184 in the tubular member 166, and are comparable to passages 182 in FIGS. 6 and 7. Fuel nozzles 204 may be axially and circumferentially offset from the openings 184 because the fuel jet trajectory will not be perfectly radial. However, openings 184 will align with the fuel jet emanating from nozzles 204 at high power conditions.

It remains to note that inner and outer heat shield tubes 188, 198 are radially spaced from inner and outer cylindrical members 194, 196, respectively, by annular air gap passages 206, 208, respectively, which act as insulators.

While there have been described herein what are considered to be preferred embodiments of the invention, other modifications will occur to those skilled in the art from the teachings herein, and it is, therefore, desired to secure in the appended claims all such modifications as fall within the true spirit and scope of the invention. For example, while the secondary air swirler means have been indicated as preferably comprising circumferentially spaced vanes, one or more annular rows of tangentially directed ports in a swirl ring could be substituted, similar to the primary swirler alternate form shown in FIG. 5. The particular type of air swirling means or the direction of swirl of one annulus with respect to the other may be selected from conventional teachings of the art.

Having thus described the preferred embodiments of the invention, what is claimed as novel and desired to be secured by Letters Patent of the United States is:

1. An improved swirler and fuel injector for a gas turbine combustor of the type having means supplying air to an upstream inlet end thereof, said gas turbine combustor also including a source of fuel and fuel flow control means, said improved swirler and fuel injector comprising:

annular flow directing means mounted in said inlet end;

a fuel injector body centrally disposed within said annular flow directing means and being connectable to said source of fuel;

a tubular member disposed mutually coaxial with and spaced between said fuel injector body and said annular flow directing means and defining respectively therewith an inner annulus and an outer annulus;

primary air swirler means and secondary air swirler means for swirling air entering said inner and outer annuli respectively;

fuel channeling means disposed in said fuel injector body for channeling fuel from said fuel source into said inner annulus as primary fuel and into said outer annulus as secondary fuel downstream of said secondary air swirler means during only a preselected portion of operation of said combustor to support combustion in said secondary recirculation zone; and said tubular member having a downstream and disposed downstream beyond a terminating end of said fuel channeling means to define a primary recirculation zone radially within said tubular member for receiving a mixture of said primary fuel from said fuel channeling means and air from said primary air swirler means, and to define a secondary recirculation zone radially surrounding said tubular member for receiving a mixture of said secondary fuel from said fuel channeling means and air from said secondary air swirler means.

2. The improvement according to claim 1, wherein said source of fuel comprises a primary source and a secondary source, and further including conduit means connected to said secondary source, said conduit means extending from said fuel injector body through said primay air swirler means and opening into said outer annulus downstream of said secondary air swirler means.

3. The improvement according to claim 2, wherein said conduit means extend substantially radially outward from said fuel injector body, and are arranged to provide airblast atomization of fuel from said secondary source.

4. The improvement according to claim 2, wherein said fuel channeling means comprises a pressure atomizing type connected to said primary source.

5. The improvement according to claim 2, wherein said fuel channeling means comprises an airblast atomizing type connected to said primary source.

6. The improvement according to claim 2, wherein said fuel channeling means receives a preselected minimum flow from said primary source designed to sustain a stable combustion in the primary recirculation zone and to cool the fuel injector body.

7. The improvement according to claim 2, wherein said fuel injector body is provided with a heat shield member enclosing and spaced from it by an insulating dead air space.

8. The improvement according to claim 2, wherein said primary air swirler means comprises a plurality of circumferentially spaced substantially radial vanes connected at radially inner and outer ends to said fuel channeling means and said tubular member, respectively, and wherein said conduit means comprises pipes extending longitudinally through selected vanes.

9. The improvement according to claim 8, wherein said selected vanes define longitudinal holes and wherein said pipes are spaced inside said longitudinal holes in the vanes to provide heat shielding of fuel in said pipes.

10. An improved swirler and fuel injector for a gas turbine combustor of the type having means supplying air to an upstream inlet end thereof, said gas turbine combustor also including a bimodal fuel control means for controlling a primary source of fuel flow and an independently staged secondary source of fuel flow, said improved swirler and fuel injector comprising:

annular flow directing means mounted in said inlet end of said combustor for supplying air to the interior thereof;

a fuel injector body coaxially disposed within said annular flow directing means, said fuel injector body defining primary and secondary fuel manifolds connected to said primary and secondary sources of fuel flow respectively;

a primary fuel nozzle disposed on the downstream end of said fuel injector body and connected to said primary fuel manifold;

a tubular member disposed mutually coaxial with and spaced between said fuel injector body and said annular flow directly means to define an outer annulus and an inner annulus, said tubular member having a downstream end terminating downstream of said primary fuel nozzle to define therewith a primary recirculation zone, said annular flow directing means having a downstream end terminating downstream of said tubular member to define therewith a secondary recirculation zone radially surrounding said tubular member;

secondary air swirler means disposed at the inlet of said outer annulus for swirling the air entering said secondary recirculation zone;

primary air swirler means disposed at the inlet of said inner annulus for swirling the air entering said primary recirculation zone;

said primary recirculation zone being disposed within said tubular member for receiving a mixture of fuel from said primary fuel nozzle and air from said primary air swirler means; and a plurality of conduit means extending outwardly from the fuel injector body through said primary air swirler and opening into said outer annulus downstream of said secondary air swirler means, said conduit means being connected to said secondary fuel manifold at their inner ends for providing fuel in said outer annulus for mixing with said air entering said secondary recirculation zone.

11. The improvement according to claim 1, wherein said tubular member includes a plurality of circumferentially spaced openings, and wherein said fuel channeling means includes a plurality of radially directed passages positioned to direct a plurality of circumferentially spaced, radially directed jets of fuel radially outward and through said respective tubular member openings into said outer annulus downstream of said secondary air swirler means during said preselected portion of operation of said combustor.

12. The improvement according to claim 11, wherein said fuel channeling means includes a fuel manifold connected to radial passages in said fuel injector body, and which are arranged to provide airblast atomization of fuel from said fuel source.

13. The improvement according to claim 11, wherein said fuel channeling means receives a preselected minimum flow from said source of fuel designed to sustain a stable combustion in the primary recirculation zone and to cool the fuel injector body.

14. The improvement according to claim 11, wherein said fuel injector body is provided with at least one tubular heat shield member spaced from it by an insulating annular dead air space.

15. The improvement according to claim 11, further including an annular flowsplitter disposed in said outer annulus, serving as a filming surface for impingement of said jets of fuel.

16. The improvement according to claim 15, further including an auxiliary air swirler along with said secondary air swirler supplying swirl to air entering said outer annulus.

17. An improved swirler and fuel injector for a gas turbine combustor of the type having means supplying air to an upstream inlet end thereof, said gas turbine combustor also including a fuel control system controlling a primary source of fuel flow and a secondary source of fuel flow, said improved swirler and fuel injector comprising:

annular flow directing means mounted in said inlet end of said combustor for supplying air to the interior thereof;

a fuel injector body coaxially disposed within said annular flow directing means, said fuel injector body defining a fuel manifold connected to receive both said primary and secondary sources of fuel flow;

a fuel nozzle disposed on the downstream end of said fuel injector body and connected to said fuel manifold, said fuel nozzle including a plurality of circumferentially spaced radially directed passages connected to the fuel manifold to supply radially directed fuel jets;

a tubular member disposed mutually coaxial with and spaced between said fuel injector body and said annular flow directing mean to define an inner annulus and an outer annulus, said tubular member having a downstream end terminating downstream of said primary fuel nozzle to define therewith a primary recirculation zone, said tubular member including a plurality of circumferentially spaced openings aligned with said nozzle radial passages, said annular flow directing means having a downstream end terminating downstream of said tubular member to define therewith a secondary recirculation zone radially surrounding said tubular member and supplied with air from said outer annulus;

an annular flow splitter disposed in the outer annulus to serve as a filming surface for said fuel jets and arranged to direct fuel toward said secondary recirculation zone supplied with air from the outer annulus;

secondary air swirler means and auxiliary air swirler means disposed at the inlet of said outer annulus to swirl the air entering said secondary recirculation zone;

primary air swirler means disposed at the inlet of said inner annulus to swirl the air entering said primary recirculation zone; and said fuel nozzle, tubular member and primary swirler means being sized so that said fuel jets having a first momentum and mass rate of flow are atomized in said inner annulus to supply said primary recirculation zone and said fuel jets having a second momentum and mass rate of flow greater than said first momentum and mass rate of flow pass through said tubular member openings into said outer annulus against said flow splitter and are atomized in the outer annulus to supply said secondary recirculation zone.

* * * * *